United States Patent [19]
King, Jr.

[11] 3,879,980
[45] Apr. 29, 1975

[54] HOLE ENLARGING SYSTEM

[76] Inventor: John O. King, Jr., 3990 N. Ivy Rd., Atlanta, Ga.

[22] Filed: Apr. 22, 1974

[21] Appl. No.: 462,817

Related U.S. Application Data

[63] Continuation-in-part of Ser. No. 324,484, Jan. 17, 1973, Pat. No. 3,805,578, and a continuation-in-part of Ser. No. 324,485, Jan. 17, 1973, Pat. No. 3,835,688, which is a continuation-in-part of Ser. No. 268,478, July 3, 1972, Pat. No. 3,835,615, which is a continuation-in-part of Ser. No. 33,281, April 30, 1970, abandoned, which is a continuation-in-part of Ser. No. 711,368, March 7, 1968, abandoned.

[52] U.S. Cl. ................. 72/393; 29/243.52; 29/523; 29/526; 72/391
[51] Int. Cl. ............................................. B21d 41/02
[58] Field of Search ......... 29/243.52, 446, 523, 522, 29/235, 237, 244, 280, 282, 509, 526; 72/393, 391, 370; 85/72, 63, 82, 86

[56] References Cited
UNITED STATES PATENTS

| | | | |
|---|---|---|---|
| 2,185,483 | 1/1940 | Ward | 29/523 |
| 3,270,410 | 9/1966 | Salter et al. | 29/446 |
| 3,434,327 | 3/1969 | Speakman | 29/446 |
| 3,445,908 | 5/1969 | Straub | 29/446 |
| 3,566,662 | 3/1971 | Champoux | 72/370 |

*Primary Examiner*—Richard J. Herbst
*Assistant Examiner*—James R. Duzan
*Attorney, Agent, or Firm*—B. J. Powell

[57] ABSTRACT

A system for enlarging the diameter of holes through work pieces using a seamless tubular member which includes a tool having a mandrel with an expansion section thereon of a diameter larger than the initial diameter of the holes, driving means for forcing the mandrel through the holes to enlarge same, and a backup member with an aperture therethrough of a diameter at least as small as the initial inside diameter of the tubular member that is positioned against the work pieces in opposition to the mandrel with its aperture aligned with the holes. The aperture of the backup member is enlarged simultaneously with the enlargement of the holes immediately adjacent the backup member so as to support the material of the work pieces about the holes and the seamless tubular member at all times during the enlargement of the holes. The system also contemplates the method of using same and the joint produced thereby.

10 Claims, 12 Drawing Figures

HOLE ENLARGING SYSTEM

CROSS-REFERENCE TO RELATED APPLICATIONS

This application is a continuation-in-part of my co-pending application Ser. No. 324,484, filed Jan. 17, 1973, now U.S. Pat. No. 3,805,578, and a continuation-in-part of my co-pending application Ser. No. 324,485, also filed Jan. 17, 1973, now U.S. Pat. No. 3,835,688, application Ser. No. 324,485 being a continuation-in-part of my co-pending application Ser. No. 268,478, filed July 3, 1972, now U.S. Pat. No. 3,835,615, which is in turn a continuation-in-part of my earlier filed application Ser. No. 33,281, filed Apr. 30, 1970, now abandoned, which was in turn a continuation-in-part of my earlier filed application Ser. No. 711,368 filed Mar. 7, 1968, now abandoned.

BACKGROUND OF THE INVENTION

Techniques and expansion tools for enlarging the effective diameter of holes through work pieces are available on the market today. Such prior art systems usually include a mandrel with an expansion section thereon of a diameter larger than the initial diameter of the holes through the work pieces and which is pulled or forced through the holes of the work pieces to enlarge the effective diameter of the holes. A tubular member may be used in conjunction with the mandrel through which the mandrel works to enlarge the hole. One of the problems with these prior art systems is that when the holes are enlarged an appreciable amount, the excessive forces generated within the material about the holes and within the tubular member has caused the material at that end of the holes from which the mandrel exits and the tubular member to be extruded outwardly to form an undesirable lip about that end of the holes. This is because the material about the holes and the tubular member is not adequately supported. The lip has caused improper seating of the fasteners that are usually installed in the hole after they are enlarged to produce an unsatisfactory joint.

This technique of forcing a mandrel through a pilot hole has been used to attempt to finally size the hole. Because the material of the work pieces rebounds after the passage of the mandrel through the holes and the amount of rebound is a function of the amount the pilot hole is enlarged, it has been necessary to accurately size the holes either before or after the enlarging operation with a tool such as a reamer in order to accurately determine the final hole size. Thus, because of the inability to accurately control the reaming operation when using manually held tools, this technique has been unable to accurately size holes.

SUMMARY OF THE INVENTION

The invention disclosed herein overcomes these and other problems associated with the prior art hole enlarging systems in that means is provided whereby the extruded lip around that end of the hole and the tubular member from which the enlarging mandrel was withdrawn is not formed. Also, a seamless tubular member is positioned in the holes when the mandrel is passed therethrough which rebounds less than the material of the work pieces upon enlargement so that the tubular member limits the rebound of the work pieces about the holes to such an extent that the final size of the passage through the tubular member is substantially constant even though the amount of enlargement of the holes through the work pieces may vary from hole to hole. The seamless tubular member which is headless is prevented from being stripped from the holes by a washer-shaped backup member which has an aperture therethrough which is at least as small in diameter as the initial inside diameter of the seamless tubular member. As the mandrel passes out of the seamless tubular member during the enlargement thereof, the aperture through the backup member is enlarged simultaneously with the tubular member so that the tubular member is always supported against stripping out of the holes during the expansion operation.

The apparatus of the invention includes generally a headless seamless tubular member positionable in the pilot holes through the work pieces to be enlarged, and a mandrel with a support section slidably receivable through the tubular member and an expansion section of a prescribed diameter larger than the inside diameter of the tubular member. The backup member has an aperture therethrough at least as small as the inside diameter of the tubular member prior to enlargement and is positioned on the support section of the mandrel in opposition to the expansion section. The backup member is sufficiently strong in compression to prevent its collapse during the withdrawing of the expansion section through the tubular member, but is sufficiently weak in radial expansion to allow the expansion section of the mandrel to pass therethrough and enlarge the aperture simultaneously with the enlargement of the tubular member.

The method of the invention includes positioning a seamless tubular member having a rebound that is less than that of the material of the work pieces in holes through the work pieces and enlarging the tubular member and the holes of the work pieces through the tubular member. This causes the tubular member to limit the amount of rebound of the material of the work pieces so that the final size of the inside of the tubular member is relatively constant even though the amount of enlargement of the holes may vary.

These and other features and advantages of the invention will become more fully understood upon consideration of the following specification and accompanying drawings wherein like characters of reference designate corresponding parts throughout the several views and in which:

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Referring to the figures, it will be seen that the apparatus of the invention includes generally a seamless tubular member 10, an expansion mandrel 11 and a backup member 12. The tubular member 10 is held within pilot holes H through work pieces P by the backup member 12 while the mandrel 11 is withdrawn through the tubular member 10 to enlarge the tubular member into engagement with the work pieces and enlarge the pilot holes H. After the mandrel is withdrawn through the tubular member, the tubular member limits the rebound of the material of the work pieces to determine the final hole size independently of the amount of enlargement of the pilot holes. The tubular member 10 is left in the holes H after enlargement and the opposite ends of the tubular member are generally flush with the opposite sides of the work pieces P at the joint J.

Figure 4:
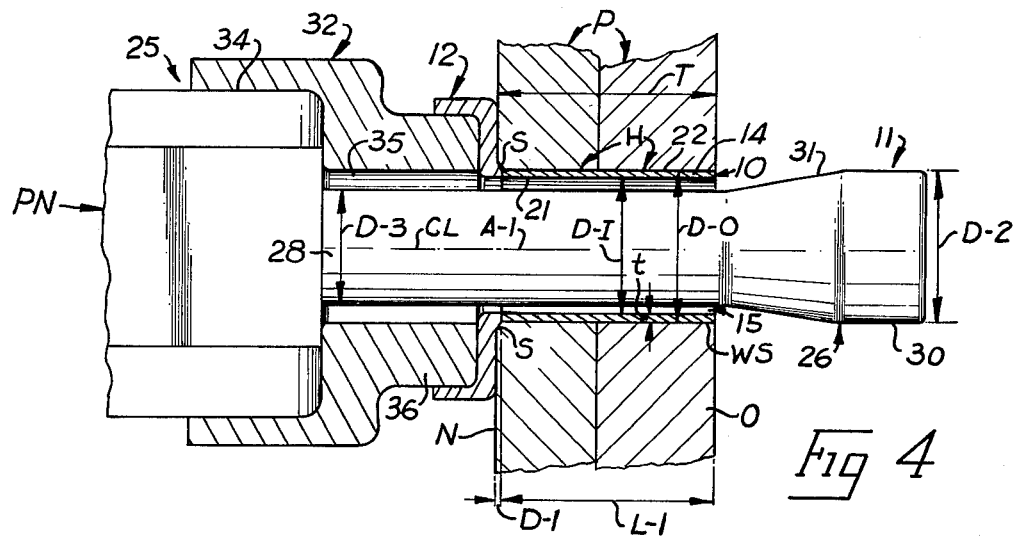
FIG. 4 is a view illustrating the invention ready for use.
Figure 5:
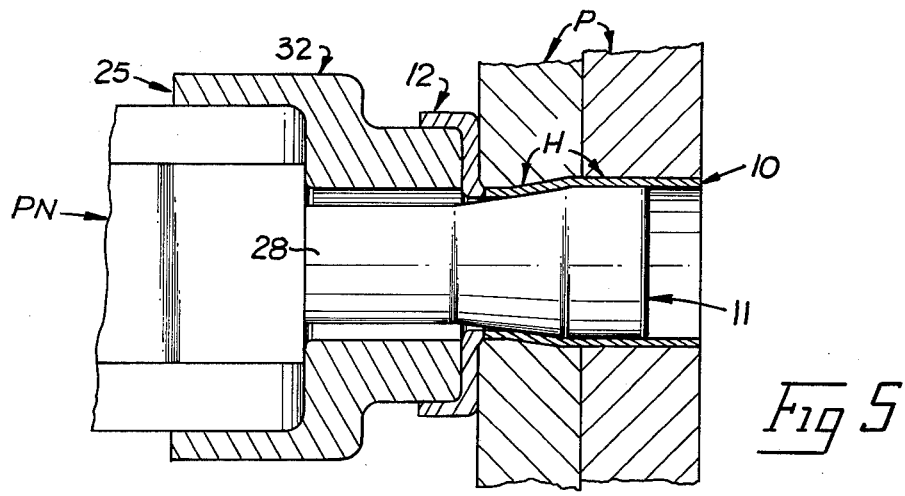
FIG. 5 is a view illustrating the invention being used.
Figure 6:
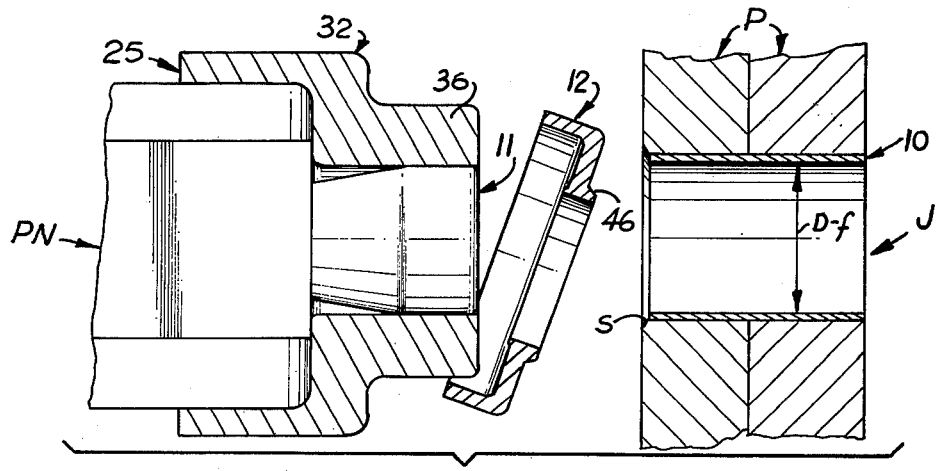
FIG. 6 is a view illustrating the invention immediately after use.
Figure 8:
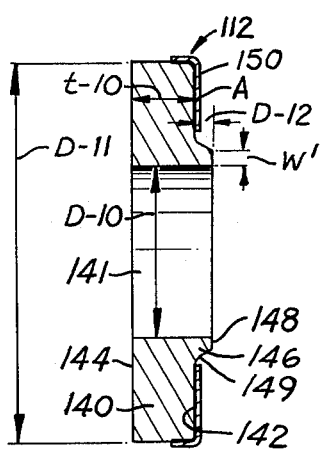
FIG. 8 is a cross-sectional view taken along line 8—8 in FIG. 7.
Figure 7:
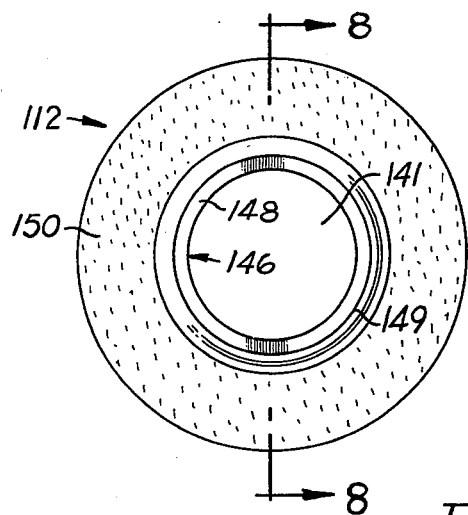
FIG. 7 is an enlarged front view of a second embodiment of the back-up member.
Figure 12:
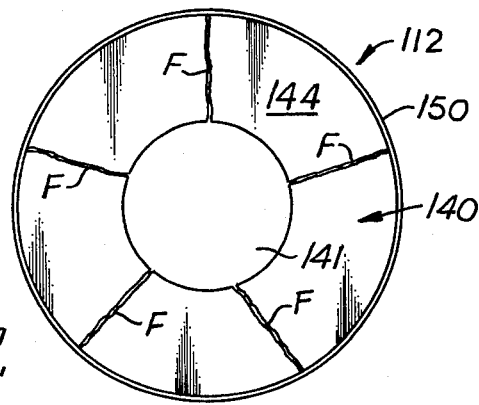

The pilot holes H through the work pieces P have an axis A-1. The near or working side N of work pieces P has been deburred to form the deburred shoulder S at the juncture of holes H with side N as best seen in FIGS. 4–6. The shoulder S is tapered so that its smallest diameter is recessed a distance D-1 from the side N. The working surface WS of holes H extends from the off or rear side O of the work pieces P to the shoulder S and has a length L-1 which is shorter than the total thickness T of the work pieces P by the distance D-1.

Referring now to FIGS. 1 and 4-6, the seamless tubular member 10 includes an annular side wall 14 defining a central passage 15 therethrough about centerline CL. The member 10 has a length L-2 substantially equal to the length L-1 of the working surface WS of holes H as will become more apparent. The wall 14 is illustrated as having a constant diameter along its length, however, it is to be understood that all or a portion of the side wall 14 may be tapered without departing from the scope of the invention.

The thickness of side wall 14 is substantially constant along its length so as to define concentric inner and outer surfaces 21 and 22. The material and the thickness of the side wall 14 are such that the amount of rebound or recovery upon expansion is very small. One such material that has been found satisfactory is stainless steel when the thickness of side wall 14 is approximately 0.008–0.016 inch and where the work pieces are of a material such as an aluminum alloy. It is to be understood that different materials and thicknesses may be used without departing from the scope of the invention. The side wall 14 has an outside diameter D-O, an inside diameter D-I prior to enlargement as will be more fully explained.

The mandrel 11 is designed for use with a driving unit 25 for forcing the mandrel through the tubular member 10. As seen in FIGS. 1 and 4–6, the mandrel 11 has an expansion section 26 at one end, a central support section 28, and a gripping section 29 at the opposite end thereof. The expansion section 26 defines a cylindrical sizing surface 30 at its free end with a tapered expansion surface 31 connecting the surface 30 with the support section 28. The diameter D-2 of the sizing surface 30 is larger than the inside diameter D-I of the member 10 and the diameter D-3 of the support section 28 is smaller than the diameter D-I of the member 10. The gripping section 29 is adapted to be gripped by the unit 25 as will be explained.

The driving unit 25 includes an adapter 32 and a commercially available lockbolt installation tool (not shown) with a self-releasing pulling nose assembly PN (partly shown). The gripping section 29 is provided with grooves and ridges to be engaged by the nose assembly PN. The adapter 32 has a large diameter recess 34 receivable over the end of the nose assembly PN at one end thereof. A circular boss 36 is provided on the opposite end of adapter 32 concentrically located with respect to recess 34 so that boss 36 is axially aligned with the mandrel receiving hole (not shown) in the operating end of the pulling nose assembly PN. A passage 35 extends centrally through the boss 36 opening into recess 34 and axially aligned with the mandrel hole in nose assembly PN when adapter 32 is in place as seen in FIG. 4. The projecting end of boss 36 defines an annular pull surface 38 thereon normal to the axis of passage 35. The passage 35 has a diameter such that the sizing surface 30 will just slidably pass therethrough. The adapter 32 serves as a spacer to prevent the expansion section 26 of mandrel 11 from being caught in the nose assembly PN since this section is normally larger in diameter than the opening in the end of the nose assembly. The adapter 32 is also removable from the nose assembly PN so that the mandrel 11 can be easily removed from the nose assembly manually after each use.

Figure 3:
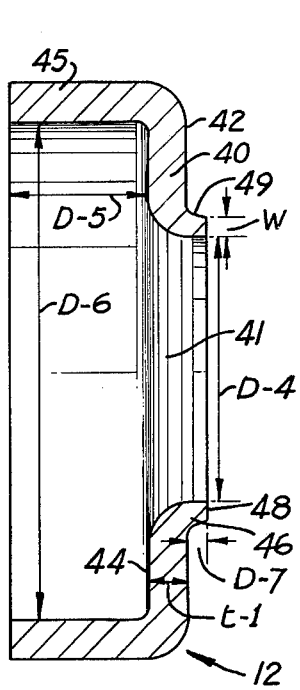
FIG. 3 is a cross-sectional view taken along line 3—3 in FIG. 2.
Figure 2:
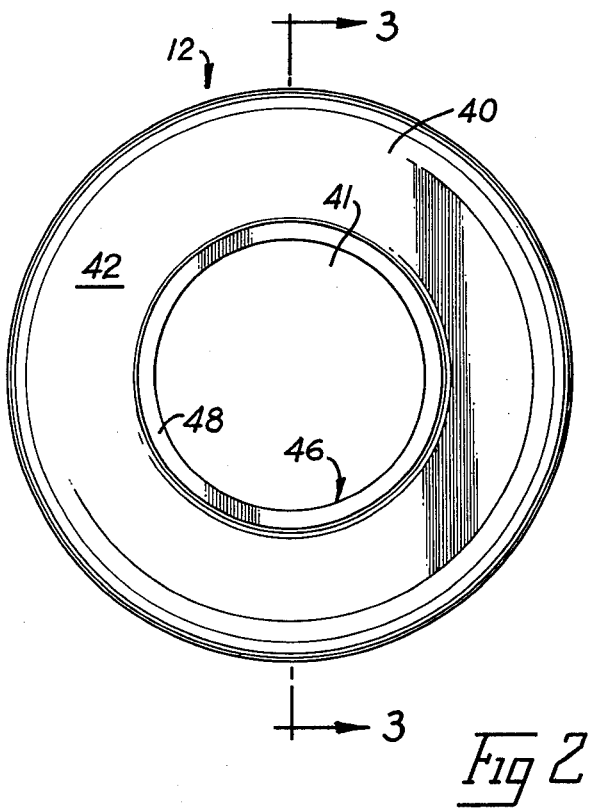
FIG. 2 is an enlarged front elevational view of a first embodiment of the back-up member.
Figure 1:
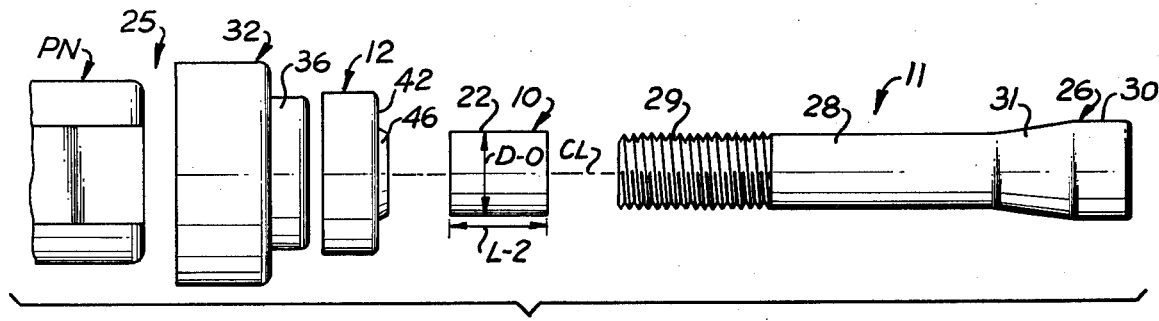
FIG. 1 is an exploded elevational view of the invention.

The first embodiment of the back-up member 12 is best seen in FIGS. 2 and 3. The member 12 is a cup shaped member with a washer shaped flange 40 that is circular and defines a central aperture 41 therethrough. The diameter D-4 of the aperture 41 is substantially equal to the inside diameter D-I of the sleeve member 10 as will become more apparent. The flange 40 has a front working face 42 and a rear working face 44 opposed to face 42. An annular positioning flange 45 is integral with the outer circumferential edge of flange 40 and extends back over the rear working surface 44 a prescribed distance D-5. The flange 40 has an inside diameter D-6 which is substantially equal to the outside diameter of boss 36 so that when the flange 40 is positioned over the boss 36, it is a snug fit to retain the back-up member 12 in place. It will also be noted that the flange 40 and central aperture 41 are concentric with each other so that when the back-up member 12 is positioned on the boss 36 with the adapter 32 on the nose assembly PN, the aperture 41 is aligned with the mandrel receiving hole in the end of the nose assembly PN. The backup member 32 has a configuration such that the pull surface 38 bears against the rear working surface 44 as will become more apparent.

An annular lip 46 is provided around the aperture 41, is integral with the flange 40, and projects forwardly the front working face 42 of flange 40. The lip 46 is concentric with aperture 41 and extends generally normal to the face 42 for a distance D-7 substantially equal to the distance D-1 of shoulder S on work pieces P as will become more apparent. The inside of lip 46 defines a passage therethrough that serves as an extension of aperture 41. The projecting end of lip 46 defines an annular flat back-up surface 48 thereon normal to the centerline of aperture 41 and generally parallel to face 42. The back-up surface 48 has a width w corresponding to the thickness t of tubular member 10 as will become more apparent. The lip 46 defines an outwardly flaring outside surface 49 that is complimentary in shape to the shoulder S on work pieces P and the inside surface of lip 46 joins smoothly with the rear working face 44 of flange 40. It will be noted that the thickness t-1 of flange 40 is thicker than lip 46 to provide sufficient strength to member 12 to prevent its collapse during expansion as will become more apparent. While the thickness t-1 may vary, the thickness t-1 shown is approximately twice the width w of back-up surface 48.

OPERATION

In operation, the pilot holes H are drilled through the work pieces P with a conventional drill. Because the invention is able to accept a hole tolerance greater than that presently associated with precision hole preparation, it is not necessary to ream the pilot holes to their final size as is presently done. The drill size for the holes H is selected so that the amount the holes will be enlarged while the expansion section 26 is within the holes H is in the order of 0.005 to 0.020 inch. Because holes can be drilled conventionally within a 0.005 inch tolerance range, this range will usually be acceptable within the overall hole enlargement range set forth above.

If the diameter D-2 of the cylindrical sizing surface 30 is smaller than the outside diameter D-O of the tubular member 10 as is usually the case, the mandrel 11, member 10 and member 12 can be assembled prior to insertion of the unit into the holes H as seen in FIG. 4. This is accomplished by positioning the back-up member 12 onto the boss 36 of adapter 32 so the positioning flange 45 holds the member 12 onto boss 36, sliding the tubular member 10 onto the support section 28 of mandrel 11, and inserting the gripping section 29 of mandrel 11 through the aperture 41 in back-up member 12 and the passage 35 in adapter 32 until the gripping section 29 is engaged by the nose assembly PN as seen in FIG. 4.

The operator can then insert the tubular member 10 and mandrel 11 through the holes H until the working face 42 of back-up member 12 rests against the work pieces P as seen in FIG. 4. It will be noted that the back-up surface 48 on the lip 46 of back-up member 12 is juxtaposed with one of the normal end surfaces 16 of tubular member 10 to support it and that the end surface 16 engaged by surface 48 of back-up member 12 is aligned with the juncture of the working surface WS of holes H with shoulder S. The opposite end surface 16 of tubular member 10 is substantially aligned with the off side O of work pieces P.

The driving unit 25 is then actuated to cause the nose assembly PN to pull the mandrel 11 toward it while bearing against the backup member 12 to hold the working face 42 thereon against the work pieces P in opposition to the expansion section 26 of mandrel 11. As the mandrel 11 is pulled, the section 26 of mandrel 11 moves through the tubular member 10 enlarging the side wall 14 thereof into contact with the work pieces P about holes H and then enlarging the holes H a prescribed amount.

Because the back-up surface 48 on lip 46 continuously supports the tubular member 10 in place, the tubular member 10 does not shift longitudinally within the holes H as the mandrel 11 is forced therethrough. Also, because the outside surface 49 of lip 46 is a continuation of the outside surface 22 of tubular member 10 and also conforms to the surface of shoulder S, the holes H are expanded smoothly with the shoulder S being maintained.

As the tapered surface 31 passes out of member 10, it engages the member 12 as best seen in FIG. 5 to expand the aperture 41 therethrough and the lip 46 simultaneously with the expansion of the member 10 immediately adjacent the member 12. Thus, the end of member 10 on the near side of the work pieces P is supported at all times during the passage of the expansion section 26 through member 10 to prevent the member 10 from being deformed by forming a lip thereon. A lip may be extruded on the member 12 about the back side of the aperture 41 from which the section 26 exits. The lip, however, has no detrimental effect on the work pieces P since the member 12 is discarded after the expansion of aperture 36 as seen in FIG. 6. The member 12 cannot be reused in subsequent hole enlarging operations since the enlarged aperture 41 would not adequately support the member 10 to prevent it from being stripped out of the holes of the work pieces. That end surface 16 of tubular member 10 at the shoulder S of work pieces P remains aligned with the juncture of the working surface WS and shoulder S. Thus, the joint J has the tubular member 10 properly located therein for receiving a fastener.

It will be appreciated that the final diameter D-f of the passage 15 through tubular member 10 is slightly less than the diameter D-2 of the sizing surface 30 since the material of the work pieces P rebounds and causes the tubular member 10 to rebound. Because the tubular member 10 has less of a tendency to rebound than the material of the work pieces P, the final diameter D-f is determined by the size of the sizing surface 30 of mandrel 11 rather than the initial diameter of holes H. It will also be understood that the hole H in the work pieces P may be enlarged different amounts if the thickness of the side wall 14 of tubular member 10 is appropriately varied.

Because the tubular member 10 is left in the holes after they are enlarged, an added benefit is achieved in that a hard durable surface is provided within the holes that resists damage as the fastener is installed. This surface on the inside of the member 10 further allows the fastener to be driven into interference if it is desirable. Even if the member 10 is scratched or otherwise damaged during the placement of the fastener therethrough, the fatigue life of the work pieces is extended because the damage is segregated from the holes.

Because of the high friction forces involved, it may be desirable to lubricate the interface between the tubular member and the mandrel. While various lubricants may be used, a dry film lubricant that is commercially available has been used satisfactorily. This dry film lubricant is usually applied to the inner surface of the tubular member so that the mandrel does not have to be recoated before each use.

ALTERNATE EMBODIMENT OF BACK-UP MEMBER

An alternate embodiment of the back-up member is illustrated in FIGS. 8-12 and is designated by the numeral 112. The member 112 has a washer shaped flange 140 defining a central aperture 141 therethrough with a diameter D-10. Flange 140 has an outside diameter D-11 and a thickness t-10. The material of flange 140, the diameter D-11, and thickness t-10 are such that member 112 is sufficiently strong in compression through its thickness so as not to collapse as mandrel 11 is withdrawn through the tubular member 10 but sufficiently weak in a radial direction to fracture as the expansion section 26 of mandrel 11 passes therethrough so that the aperture 141 will be enlarged simultaneously with the expansion of the tubular member 10 immediately adjacent back-up member 112.

The flange 140 defines a front working face 142 and a rear working face 144. An annular lip 146 is provided around the aperture 141, is integral with the flange 140, and projects forwardly over the front working face 142 of flange 140. The lip 146 is concentric with aperture 141 and extends generally normal to the face 142 for a distance D-12 substantially equal to the distance D-1 of shoulder S on work pieces P as will become more apparent. The inside of lip 146 defines a passage therethrough that serves as an extension of aperture 141. The projecting end of lip 146 defines an annular flat back-up surface 148 thereon normal to the centerline of aperture 141 and generally parallel to face 142. The back-up surface 148 has a width w' corresponding to the thickness t of tubular member 10 as will become more apparent. The lip 146 defines an outwardly flaring outside surface 149 that is complimentary in shape to the shoulder S on work pieces P. It will be noted that the thickness t-10 of flange 140 is thicker than lip 146 to provide sufficient strength to member 12 to prevent its collapse during expansion as will become more apparent.

Figure 9:
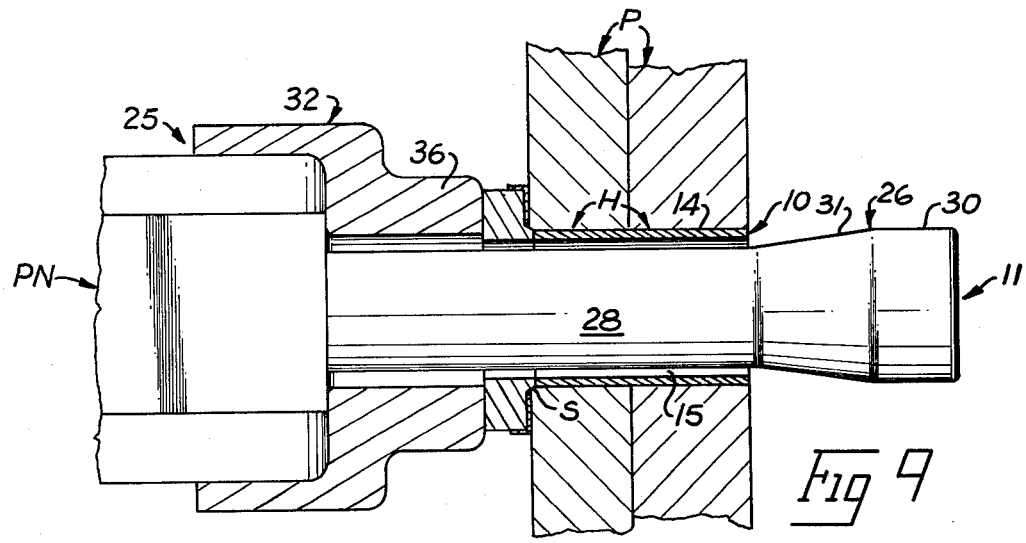
FIG. 9 is a view illustrating the invention using the second embodiment of the back-up member ready for use.
Figure 10:
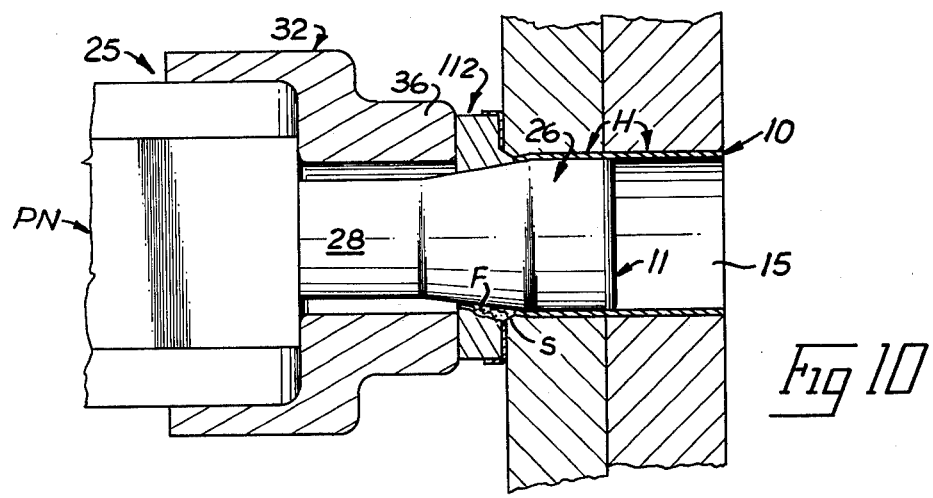
FIG. 10 is a view illustrating the invention using the second embodiment of the back-up member in use.
Figure 11:
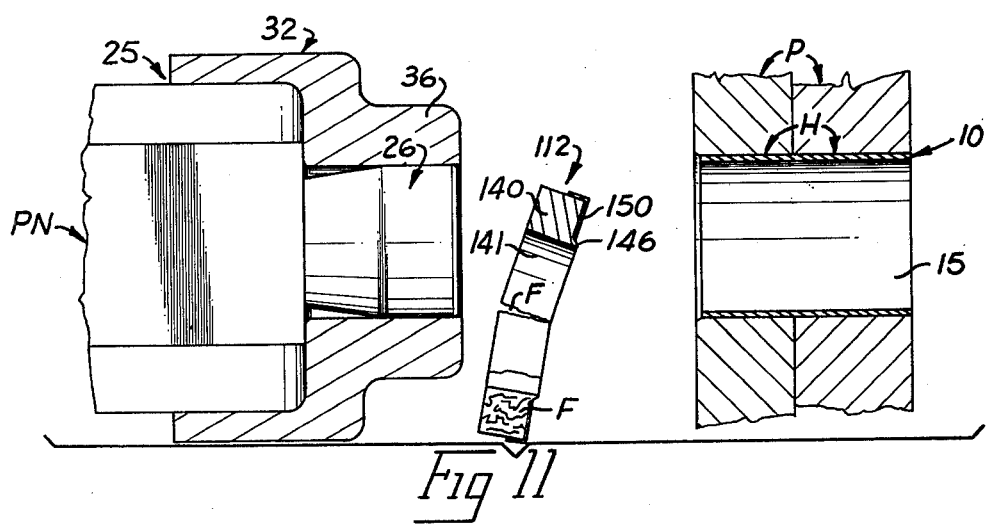
FIG. 11 is a view illustrating the invention using the second embodiment of the back-up member immediately after use; and, FIG. 12 is an enlarged rear view of the second embodiment of the back-up member after use.

To maintain the member 112 as a unit upon the fracturing thereof as the mandrel 11 is forced therethrough, a flexible annular, resilient retaining member 150 is attached to the front working surface 142 of member 112. While different members 150 may be used, the member 150 illustrated is an adhesive tape member having an adhesive coating A on the back thereof that sticks to the face 142 of member 112. The member 150 also serves as a cushion since it bears against the near side N of work pieces P during the enlarging operation as seen in FIGS. 9-10.

The back-up member 112 is used similarly to member 12 to install the tubular member 10. The tubular member 10 is loaded onto mandrel 11 followed by the back-up member 112 and the mandrel 11 inserted into the pulling nose assembly PN through adapter 32. The unit can then be inserted through holes H as seen in FIG. 9. The mandrel is then pulled through member 10 as seen in FIG. 10. As the tapered surface 31 enters the aperture 141, the member 112 starts to fracture generally radially at several places as indicated at F in FIG. 10 but the end surface 16 of tubular member 10 continues to be supported. As the mandrel 11 continues through member 112, it fractures along the fracture lines F but is held by the retaining member 150. This allows the lip 146 to continue to support the tubular member 10 while the lip 146 is expanded. While any number of materials may be used for member 112, a mild steel that has been case hardened after the member 112 has been formed is satisfactory.

While specific embodiments of the invention have been disclosed herein, it is to be understood that full use may be made of modifications, substitutions, and equivalents without departing from the scope of the inventive concept.

I claim:

1. A device for enlarging holes through work pieces wherein the holes have been deburred on one side thereof to form a shoulder at the holes and a working surface about the holes extending from the shoulder to the opposite side of the work pieces comprising:
   a seamless and headless tubular member having an outside diameter smaller than the initial diameter of the holes through the work pieces, defining a passage therethrough and having an annular end surface generally normal to the centerline of said tubular member;
   a mandrel having an outside larger and an outside smaller diameter, said larger diameter larger than the inside diameter of said tubular member and said smaller diameter smaller than the inside diameter of said tubular member; and,
   a back-up member including a body defining an aperture therethrough of substantially the same diameter as the inside diameter of said tubular member and larger than said smaller diameter of said mandrel so that when said smaller diameter is inserted through said passage of said tubular member and said backup member positioned on said smaller diameter in opposition with said larger diameter across said tubular member, said larger diameter and said backup member can be forced toward each other to cause said larger diameter to pass through said passage and said aperture to enlarge the diameter of said tubular member and the holes through said tubular member, said back-up member further including a lip about said aperture at one end thereof, said lip defining an annular support surface generally normal to the centerline of said aperture and corresponding in size and shape to said annular end surface of said tubular member, said lip further defining an outer surface complimentary to the shoulder at the holes in the work pieces so that said support surface on said lip supports said end surface of said tubular member at a prescribed location in the holes during enlargement and said outer surface enlarges the diameter at the shoulder of the work pieces as said lip is enlarged.

2. The device of claim 1 wherein said back-up member is made of a material sufficiently strong in compression through its thickness to prevent the collapse of said back-up member as said mandrel is forced therethrough and sufficiently weak and ductile radially to be enlarged by said mandrel as it passes through said aperture by radially expanding said back-up member without fracture.

3. The device of claim 2 further including forcing means for forcing said mandrel through said tubular member and said back-up member and positioning means for locating said back-up member and said tubular member within the holes through the work pieces.

4. The device of claim 2 wherein said positioning means includes a positioning flange on said body of said back-up member opposite said lip and locating means on said forcing means for engaging said positioning flange to maintain said aperture and said lip of said back-up member concentric with respect to said mandrel as said forcing means pulls said mandrel through said tubular member.

5. The device of claim 4 wherein said locating means includes a boss defining a central passage therethrough, said boss having a size and configuration adapted to engage said positioning flange and that side of said body opposite said lip to locate said passage through said boss in axial alignment with said aperture through said back-up member.

6. The device of claim 5 wherein said back-up member is made of stainless steel.

7. The device of claim 1 wherein said back-up member is made of a material sufficiently strong in compression through its thickness to prevent the collapse of said back-up member as said mandrel is forced therethrough and sufficiently weak and fracturable radially to be enlarged by said mandrel as it passes through said aperture by radially fracturing said back-up member.

8. The device of claim 7 further including retaining means for maintaining said back-up member as a unit upon the fracturing thereof.

9. The device of claim 7 further including cushion means between said body of said back-up member and the working surface of the work pieces during the forcing of said mandrel through said tubular member and said back-up member.

10. The device of claim 7 further including an annular, flexible and resilient member adhesively attached to that end of said back-up member about said lip.

* * * * *